Aug. 22, 1939.    J. SOLER    2,170,487
ELECTROMECHANICAL APPARATUS
Filed June 22, 1936
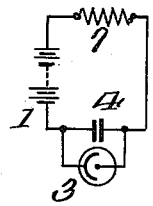
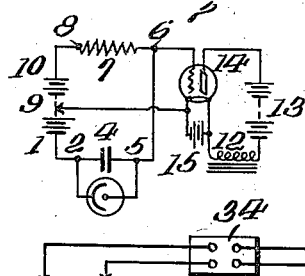
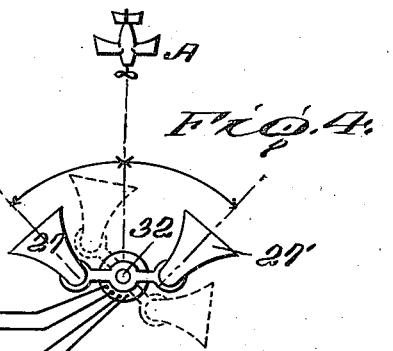
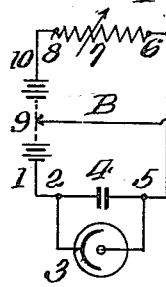
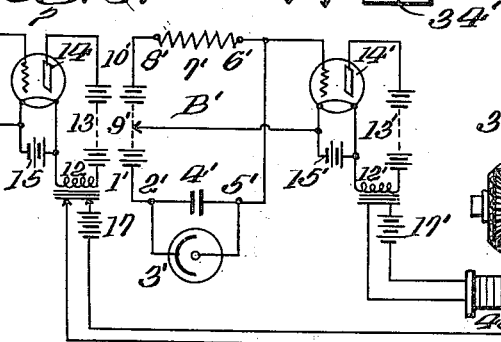
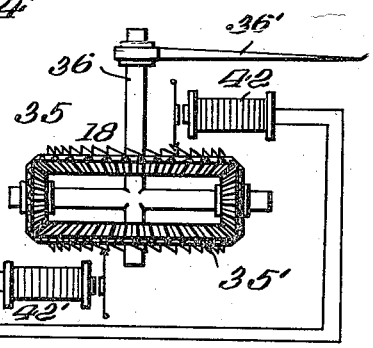
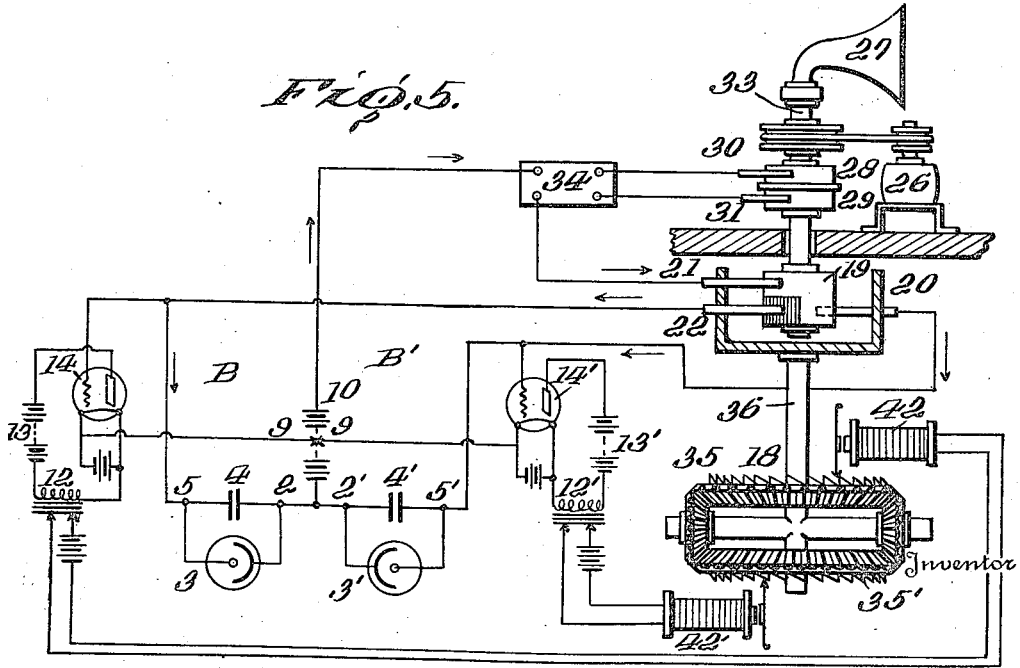
Inventor
Jose Soler
By E. F. Wenderoth
Attorney Patented Aug. 22, 1939

2,170,487

UNITED STATES PATENT OFFICE 2,170,487

ELECTROMECHANICAL APPARATUS

José Soler, Buenos Aires, Argentina

Application June 22, 1936, Serial No. 86,702
In Spain February 28, 1936

3 Claims. (Cl. 250—36)

My invention relates to a device for measuring electric values such as intensities, voltages, resistances or capacities, by a comparative process. It is characterized essentially by the simultaneous use of two electric circuits, each of determined characteristics, into which circuits the values to be measured or compared are introduced in the form of electric currents, together with a differential mechanism providing an indication of the measurement or the result of the comparison between the compared electric values.

More particularly, my invention is characterised by the simultaneous use of two like circuits through which currents to be compared are caused to circulate, said circuits converting continuous current circulating therethrough into electric impulses of a frequency proportional to the intensity of said current. These electric impulses, which conveniently may be amplified, are then converted into mechanical impulses of like frequency to the said electric impulses. The mechanical impulses corresponding to each said circuit are caused to act in convenient manner upon the planetaries or motive wheels of a differential mechanism, turning in contrary directions at velocities also proportional to the frequencies of each said circuit. As a consequence there is produced in the differential mechanism a third or resultant movement providing an indication of the result of the comparison between the electric values of the currents which have been caused to circulate through the said circuits, and the values of which currents are to be measured or compared.

For better understanding of the following description of preferred embodiments of my invention, reference should be had to the accompanying drawing, wherein:

Fig. 1 is a diagram of a simple oscillatory circuit;

Fig. 2 is a diagram of the fundamental electric circuit according to my invention;

Fig. 3 is a diagram of a completed embodiment of my invention, composed of two electric circuits similar each to that of Fig. 2, together with a differential mechanism common to both circuits;

Fig. 4 is a fragmentary schematic showing of one mode of utilization of my invention; while Fig. 5 is a diagram of a variation of my invention, composed of two similar electric circuits, a switch for alternating the energization of said circuits, and a differential common to both said circuits.

In Fig. 1 is illustrated a common oscillator circuit, shown for example in 1879 by Hittorf in his Annals for Physics and Chemistry, volume 7, page 565, and relating to a rare-gas-filled space discharge tube. However, since said circuit constitutes the working basis of the circuits employed in my invention I find it advisable at this point to include a short description of the circuit of Fig. 1.

Therein a source of continuous current 1, a capacitative reactance 4 and an impedance, either fixed or variable, 7, are all connected in series. A discharge device 3, e. g. a rare gas lamp, is connected in parallel with the capacitative reactance 4 and is designed to be disruptively energized by said capacitative reactance when the charge on the latter reaches a predetermined voltage.

The operation of this device, well known, is as follows:

When a potential supply 1 is connected across the condenser 4, as shown in Fig. 1, the latter charges until the potential difference across its terminals reaches the ignition voltage of tube 3, at which moment tube 3 is ignited, so that condenser 4 discharges therethrough. This discharge persists until the potential difference between the terminals of condenser 4 has fallen to the extinction voltage of lamp 3, at which moment the discharge ceases. Condenser 4 then begins anew the charging process, and the periods of charging and discharging of the condenser thus follow each other in regular sequence at a frequency dependent upon the intensity of the current and the capacity of the condenser.

In Fig. 2, showing a diagram of the fundamental electric circuit of my device is provided an oscillatory circuit similar to that described in connection with Fig. 1. An amplifying circuit is also provided, comprising a source of continuous current 13, a thermionic valve 14 and a relay 12, all connected in series. Two connections electrically unite the circuits with each other; conductor 9, 15 variably connects the battery 1, 10 with the cathode of valve 14, and a second conductor connects the variable voltage of terminal 5 of condenser 4 with the grid of valve 14. The operation of this complete circuit is simple. Only the voltage variations which are produced in the terminal 5 of condenser 4 are transferred to the grid of valve 14.

Since conductor 9, 15 imparts to the filament of valve 14 a fixed and adequate potential relative to the anode thereof, the polarization variations which the grid receives due to charge and discharge of the condenser 4, through tube 3, are amply sufficient for controlling the passage of the anode current of valve 14.

It will be seen that when the potential of the terminal 5 of condenser 4 is lower than the potential imparted to the filament of valve 14 by conductor 9, 15, the grid necessarily is negative with respect to the filament and interrupts the passage of the space current. On the other hand, when the potential of terminal 5 of condenser 4 is higher than that of the filament, the grid is positive with respect thereto, and permits the passage of the space current. During this current-carrying interval, relay 12, which remains in series with the plate of valve 14, is excited and attracts an armature, to be described hereinafter.

It is thus seen that for each charging and discharging cycle of condenser 4 there is a corresponding electric impulse or lighting up of lamp 3, and an excitation or mechanical impulse in relay 12. Accordingly, the frequency of the mechanical impulses produced by relay 12 is the same as the frequency of the oscillations or electric impulses produced in the oscillatory circuit.

The frequency with which condenser 4 is charged and discharged depends upon (1), its own capacity, and (2), the intensity of the circulating current; and as this intensity depends in turn on the applied voltage and on the resistance of the circuit, it necessarily follows that the oscillation frequency will be proportional to the intensity of the current, to the voltage applied, to the resistance of the circuit, and to the capacity of condenser 4.

It is at once seen that with such a circuit, not only the value of each of the factors which enter in the constitution of a current can be measured, such as intensity, voltage, resistance or capacity, but also the fixed or variable value of the intensity of any phenomenon which is external to the electric current, but which itself will produce a variance in the value of any one of said factors.

Having thus described the construction and operation of the fundamental electric circuit which my invention utilizes, I turn now to the complete device shown diagrammatically in Fig. 3. As can be seen from said figure, this device employs two electric circuits B and B', of the same electrical characteristics, and which are exactly the same as that described with reference to Fig. 2. The currents to be measured flow through these circuits, or perhaps the current supply to the respective circuits is modulated through external agents acting upon them, it being these external agents themselves which are to be compared in this last-mentioned case.

A differential mechanism is employed (which may be of any desired type) receiving upon planetaries or motive wheels 35 and 35' the impulses or motion strokes produced by the armatures of electromagnets 42 and 42', in a manner which will be perfectly obvious. The electromagnet 42, energized through battery 17, is controlled by relay 12, so that each excitation of relay 12 results in a corresponding energization of electromagnet 42, and a corresponding attraction of the armature thereof. This armature is so disposed mechanically that each stroke thereof produces, as through the intermediary of a pawl or the like, an impulse imparting a rotating movement to the planetary wheel 35 of differential 18. It is to be noted that such rotational movement is always in a single direction, e. g. to the left in Fig. 3. In similar manner electromagnet 42' is governed by relay 12', and through its armature causes the planetary 35' of differential 18 to turn step by step in a rotary direction opposite to that of wheel 35, e. g. to the right in Fig. 3.

For each excitation of relay 12, therefore, there is a corresponding movement to the electromagnet 42, accompanied by an angular advancement, in a step by step fashion to the left in Fig. 3, of the planetary 35. In like manner there is, for each excitation of relay 12', a corresponding movement of the electromagnet 42', accompanied by an angular advancement, in a step by step fashion, to the left in Fig. 3, of the planetary 35'.

It follows that the velocity with which the planetary 35 turns to the left corresponds to the frequency of the pulsations which are produced in the oscillator B; while the velocity at which the planetary 35' turns to the right corresponds to the frequency of the pulsations which are produced in the oscillator B'.

When one or both planetaries 35 and 35' of differential 18 are rotating, a rotary movement of the differential upon itself is produced in its principal axis 36. This resultant rotary movement is in the same direction as that of that planetary which is turning more rapidly, and at a velocity which is equal to half the difference of the turning velocities of both planetaries.

It is convenient to point out at this time that in Figs. 3 and 4 the electromagnets 42 and 42' are shown as acting directly upon planetaries 35 and 35'. One would suppose from this that said planetaries are subjected from time to time to sudden rotary movements of considerable angular amounts, depending upon the frequency of the armature movement of the electromagnets, and the operation has been so shown for simplicity of illustration. In practice, however, these movements may be made as small as desired, since the electromagnets would be made to act upon the planetaries through the intermediary of adequate reduction mechanisms, as a result of which the angular rotation of said planetaries, and therefore of the axle 36, can be reduced to no more than a practically insignificant mechanical vibration or oscillation (of the order of a few angular minutes).

Now, it having already been seen that the turning velocities of the planetaries correspond to the frequency of pulsation of their corresponding oscillators, it follows that when the frequency of oscillator B, say, is greater than the frequency of oscillator B', then the shaft 36 of differential 18 will turn to the left in Fig. 3; in like manner when the frequency of oscillator B' is greater than that of oscillator B, then shaft 36 turns to the right in Fig. 3. When the frequencies of both oscillators are exactly the same, then the shaft 36 is without motion.

However, as has been said hereinbefore, the frequency of pulsation in each oscillator is proportional either to the electric values of its circuit or to the intensity of the external agents which modify each of said values, as the case may be. By consequence, the rotary movement which the shaft 36 will make in one direction or the other is an accurate indication of the result of the comparison between either the electric values to be compared, or of the causes foreign to the circuits, but which are caused to vary the said electric values.

In short, an essential part of my invention is the differential 18, the rotation of the axle 36 of which indicates in direction and quantum, of movement, which of the compared values is greater. It is possible at this time, either mechanically or automatically, as will be seen, to bring about the modification of at least one of the compared values until an equalization is obtained, at which moment the shaft 36 of the differential will remain stationary.

For simplicity I will now describe the operation of the device as applied to the solution of a practical case. Let us suppose that the value of a resistance is to be measured.

Referring to Fig. 3, assume that resistance 7 is variable and calibrated in known values, and that resistance 7' is a fixed resistance, the value of which is to be measured. All this is illustrated in the said diagram.

Since capacity 4 is equal to capacity 4', and since the voltage output of battery 1—10 is equal to that of battery 1'—10', then when both oscillatory circuits are put into action, the frequency of oscillation in each circuit will be directly proportional to the intensity of the current which circulates through it, and therefore inversely proportional to the value of the resistance of each circuit. The turning velocity of both planetaries of differential 18 will also be subject to this proportionality.

A pointer or similar indicator 36' may be secured to the shaft 36 of the differential for indicating whether the shaft is turning and in which direction, or whether it is standing still. When the pointer 36' turns to the right, this is because the variable resistance 7 has a greater value than resistance 7'; and conversely, when it turns to the left, it is because the value of resistance 7 will be less than that of resistance 7'. Consequently, by varying the value of the variable resistance 7 until the pointer remains stationary, it will be possible to equalize the values of both resistances. When then the value of the calibrated resistance 7 is read, the value of resistance 7', the resistance to be measured, and which is equal to the value to which the resistance 7 has been adjusted, will be known.

Voltages, capacities, or impedances of any kind may be determined in the same manner as has been described for the determination of the value of a resistance by comparison with another resistance. Likewise, the same procedure can be followed for measuring by comparison the values of electric currents controlled by thermionic valves, photo-electric cells, microphonic cases, etc.; or in general, wherever such currents are controlled by any auxiliary equipment which is capable of acting like an impedance, or which, directly or indirectly, can in any way govern the passage of an electric current.

Intensities or the variations of intensity of phenomena or foreign agents which may influence the values of the electric currents can be measured or compared with the same facility as in the case of the characteristics of electric currents to be measured or compared, i. e. my device serves for measuring by comparison all data which can either directly or indirectly bring about a variation in the intensity of an electric current or any of its values. In any such case I use always the fundamental device shown in Fig. 3, except that for the resistances 7 and 7' would be substituted, between the terminals 6—8 and 6'—8' of the oscillatory circuits either the electric values to be compared or the circuits or part of the electric circuits which contain said values.

It will be interesting to note the solution, according to my invention, of a second typical case. Assume that it is desired to determine the direction in which a sound-emitting device or source, such for example as an airplane, is located. The procedure to be followed is that of comparing the intensities of the amplifying current of two microphones provided with collecting horns of directional effect.

The device to be used is fundamentally that of Fig. 3, provided, however, with adequate auxiliary equipment for proportioning the values to be compared.

In Fig. 4 is illustrated a typical instance of such auxiliary equipment. Therein an airplane A is assumed to be the source of sound. Two microphones 27 and 27' provided with pickup horns of directional effect are mounted solidly upon a support rotatable on shaft 32. The acoustic axes of these two microphones form between themselves a suitable angle of for instance ninety degrees. The microphonic current of horn 27 is carried to the amplifier 34, connected to the terminals 6 and 8 of the oscillator B (Fig. 3); i. e. it replaces resistance 7. Similarly, the microphonic current of horn 27' is carried to the amplifier 34', connected to the terminals 6' and 8' of oscillator B'.

When first brought into operation, the microphones occupy the position shown in broken lines, in which case in all probability microphone 27, say, will receive the signals with much greater intensity than will microphone 27', so that oscillator B will oscillate at a much greater frequency than will the oscillator B'; planetary 35 will turn to the left in Fig. 3 with greater velocity than the planetary 35' will turn to the right. In consequence pointer 36' of shaft 36 on the differential 18 will turn to the left, indicating that microphone 27 receives greater signal strength than does horn 27'.

It will become necessary to swing microphones 27 and 27' to the left in Fig. 4, about their shaft 37, the effect being the reduction of the intensity of reception of horn 27 and the increase of intensity of reception of horn 27', until finally a position is reached, shown in full lines in Fig. 4, where both microphones receive the sound with the same intensity and at which their respective oscillators work at equal frequencies. At this time the planetaries 35 and 35' turn at equal velocities, but since they turn in opposite directions, their actions counteract each other, and pointer 36' remains stationary, indicating that the position of equilibrium has been reached. The bisecting line of the angle formed by the acoustic axes of both microphones and which will be measured, in this case indicates the direction of the airplane A.

It will be readily understood without necessity of further illustration, that the same basic procedure just described could be automatically carried out by the apparatus, since to bring this about it is necessary only to mount the support sustaining both microphones upon the shaft 36 of differential 18, whereby the rotary movements of the said shaft 36, instead of serving simply as an indicating means, would now serve directly to cause the microphones to turn until they reach the position at which both will receive the sound with equal intensity. Thus, without modification of the essence of the invention, it is possible for the same apparatus to govern the auxiliary devices which themselves control the currents which are to be measured or compared, permitting thus the operation of the device in an absolutely automatic manner.

This feature of my invention is of course apart from the particular equipment which may be employed in any given case, the individual circumstances simply reducing each case to a mechanical problem common in the transmission of movements.

In Fig. 5 is illustrated another form of my device in which both oscillatory circuits B and B' have a common potential source and are governed by a common, variable impedance, controlling both circuits, the potential source and the variable impedance being connected alternately and at equal time intervals first to one and then to the other oscillatory circuit by means of a suitable switching mechanism.

For facilitating consideration, the apparatus is illustrated as provided with but a single microphone 27 for indicating, as is the case of Fig. 4, the direction in which a moving airplane is located.

Reference to Fig. 5 shows that the electric circuits thereof are the same as those of Fig. 4, but with the difference that the two oscillators B and B' have the same potential source 1—10, common to both, and that they are governed by the same impedance, which in this particular case consists of the amplifier 34 for amplifying the microphonic current of microphone 27. A switch 19 is in series in this part of the circuit, and shunts the modulated microphone current first into one and then into the other of the two oscillators, alternately.

The current through the oscillatory circuit B may be traced as follows: from battery 1—10 to amplifier 34, brush 21, switch 19, brush 22, oscillator B, and to the negative pole of battery 1. The current through the other oscillator B' is from battery 1—10 to amplifier 34, brush 21, switch 19, brush 20, oscillator B', and to the negative pole of battery 1. The amplifying circuits 13—14—12 and 13'—14'— and 12' with their relays are exactly the same as those of Fig. 4, and are connected to their respective oscillators in the same manner.

Differential 18 with its electromagnets 42 and 42' governed by relays 12 and 12' likewise is the same as that shown in Fig. 5, but on the shaft 36 is mounted a piece of insulating material serving as a support for the brushes 20, 21 and 22, which follow the rotary movements of said shaft 36.

A microphone with its acoustic horn 27 is mounted upon a vertical rotary axle 33 which is driven by suitable means such as a small motor 26 at the rate of say 1200 R. P. M. This shaft 33 is centered upon shaft 36 of the differential, i. e. they are aligned on a common axis, but they are mechanically independent of each other, and their turning movements are independent of each other.

Fixed upon shaft 33, but electrically separated therefrom, are two collector rings 28 and 29, connected with the electric terminals of microphone 27. On these rings bear brushes 30 and 31 which carry the microphonic current to amplifier 34. Fixed on the same shaft 33 and consequently turning therewith at the said speed of 1200 R. P. M. is the rotary switch 19, illustrated as comprising a cylinder of suitable insulating material, carrying on its exterior another cylinder of laminated material, metal, which in its lower part is shown as having a lateral cut out part occupying a space of half the cylinder in a circular direction and another half of the cylinder in height, i. e. it occupies a symmetrical one-quarter of the cylinder. This cut out portion is preferably built up by suitable insulating material to the surface level of the metallic sheath.

The transverse plane dividing the lower part of the cylinder 19 into two halves, along the inner margin of the said lateral cut, must be in this case perpendicular to the acoustic axis of microphone 27. Brushes 20, 21 and 22 bear on this switch cylinder 19, brush 21 bearing on the upper part of the cylinder, which always provides metallic contact along its uninterrupted surface. Brushes 20 and 22, however, alternate in metallic contact along the lower part of the cylinder, each during half a revolution of switch 19. By consequence, when switch 19 rotates, the current, arriving continuously from amplifier 34, is distributed alternately and at equal time intervals between oscillators B and B'. Although the oscillators in reality are energized alternately, since this alternation is effected at the rate of 1200 times a minute, it is continuous for all practical purposes so far as concerns the mechanical operation of the differential.

Thus each oscillator operates independently of the other, at a frequency corresponding to and dependent upon the variable intensity of the amplified current directed through it during the half-period during which switch 19 connects the disturbance-producing element 27 with it, the intensity of said current depending on the intensity of sound incident on microphone 27 during this same half-period. However, this sound intensity varies according to the orientation of the microphone with relation to the airplane. Thus, when the microphone is pointed towards the direction in which the airplane travels, it will receive with maximum intensity; when it is oriented in opposite direction, it will receve the minimum; and when it is turned towards intermediate positions, the intensities received will be also intermediate and proportional to the angles of orientation. Thus, during a complete revolution of the microphone, the sound intensities which it receives will vary in constant and regular manner, from the maximum to the minimum, passing through all intermediate phases, and from the minimum to the maximum, likewise passing through all intermediate phases.

As switch 19 divides the complete revolution into two half revolutions, and directs to each oscillator the quantity of electricity coming from amplifier 34 which corresponds to the quantity of sound received by the microphone 27 during each half revolution, it results that the proportion in which both oscillators will receive current supply will depend upon the displacement or angular position of the brush contacts upon the switch cylinder 19 in relation to the direction in which the airplane travels. However, so as to distribute into equal proportions the current of variable intensity which reaches switch 19 during a complete revolution, it is evident that the only solution consists of distributing into halves the maximum and the minimum of reception between both portions of the revolution, i. e. distributing so that during the time that one oscillator is connected in circuit the microphone will pass from the maximum value of intensity of sound reception to the minimum, through all intermediate phases; and so that during the time that the other oscillator is connected in circuit, corresponding to the other half-revolution, the microphone will pass from the minimum to the maximum, also through all intermediate phases.

It follows that for each position of the airplane, there will be only one position of the brushes at which these will receive for their respective oscillators equal quantities of electricity, and this position will be, in the case of Fig. 5, that at which the brush contacts are in the plane which, passing through the axis of shaft 33, will be perpendicular to the direction in which the airplane is located. Except as indicated in the foregoing the operation is the same as in the case of Fig. 4.

As has been stated, each oscillator will operate at a frequency which is proportional to the intensity which it receives. When these frequencies are not the same, shaft 36 of differential 18 will begin to turn to one or the other side, carrying with it during this movement the brushes 20, 21 and 22. These brushes, when varying their angular position relative to the sound source A (Fig. 4), will vary the proportion between the intensities which are received by oscillators B and B', increasing that of the oscillator which receives with the lesser intensity, and reducing that of the oscillator which receives with the greater intensity; and said shaft 36 will continue to rotate in the proper direction until the velocities of the planetary wheels and therefore the quantity of mechanical impulses of the electromagnets and of the relays are equal. This means that the number of electric impulses in the oscillating circuits, and therefore, the compared electric values, are equal to each other, in which case the shaft 36 will come to rest in its new position, indicating the direction in which the airplane is located. This position corresponds in general to the direction of the acoustic axis of the microphone at the moment of maximum reception, as has been explained.

It is so evident that no illustration is needed that with the devices of Fig. 4 or Fig. 5, if automatic control is desired, it is necessary only to provide shaft 36 of differential 18 with an electric interrupter, for example, in lieu of the pointer 36', so that, when shaft 36 turns to the right, say, it will close the interrupter and when turning to the left it will open it. To provide for such automatic operation of the device fixed values should be imparted to one of the oscillators, to make constant its operating frequency. At the same time the second oscillator is operated at the variable, modulating frequencies, with the purpose of varying one of its electric values by any desired process, for example, by causing it to work according to acoustic or other signals.

In this way, by varying the intensity of the signal transmitted to the device, it may be brought about that the oscillator operating at a variable frequency does so at a desired higher or lower frequency than that of the control oscillator operating at a fixed frequency, whereby shaft 36 of the differential is caused to turn in the desired direction, either opening or closing, as the case may be, the electric interrupter, thereby controlling any other device according to the will of the transmitter.

While many and varied examples of the utilization of my invention might be cited, I am of opinion that those given are ample for a proper understanding of the principle of operation of my invention.

While I have stated the principle of operation of my invention, and have described certain modes of utilizing the same, I intend that the foregoing description be purely illustrative and not by way of limitation, as the underlying invention can be used for many other purposes and can be executed by other means.

Therefore what I claim as new is:

1. In an electrical installation of the character described, a plurality of oscillating circuits, the circuits having in common a source of direct current supply and an impedance, either fixed or variable, and each said circuit separately comprising a capacitative reactance and a discharge device shunted across said capacitative reactance and designed to break down disruptively when the charge on said capacitative reactance reaches a predetermined voltage, mechanically-operable means for connecting said source of supply and said impedance intermittently and alternately into first one and then the other of said oscillating circuits, pulsating circuits associated one with each of said oscillating circuits and each containing an amplifying device, a source of current and a relay, means so connecting the corresponding oscillating circuit to the amplifying device that the conductance of the latter is determined by the frequency of work of the oscillating circuit, and a differential device the elements of which are controlled in convenient directions by said relays, which differential device causes additional accessories to perform a resultant movement in one or the other direction or to assume a resultant position depending upon the relative frequencies of the discharges in the said two oscillating circuits across the said discharge devices.

2. In an electrical installation of the character described, a plurality of oscillating circuits, the circuits having in common a source of direct current supply and an impedance, either fixed or variable, and each said circuit separately comprising a capacitative reactance and a discharge device shunted across said capacitative reactance and designed to break down disruptively when the charge on said capacitative reactance exceeds a predetermined voltage, a mechanical connector for connecting said source of supply and said impedance intermittently and alternately into first one and then the other of said oscillating circuits, pulsating circuits associated one with each of said oscillating circuits and each containing a source of current supply, a grid valve amplifier, and a relay, and leads so connecting the corresponding oscillating circuit with its pulsating circuit that the frequency of the discharges across said valves and hence the frequency of the current impulses through the corresponding relay is determined by the frequency of the discharges across said discharge device in the oscillating circuit, and a differential device, the elements of which are controlled in convenient directions by said relays, which differential device causes additional accessories to perform a resultant movement in one or the other direction or to assume a resultant position depending upon the relative frequencies of the discharges in the said two oscillating circuits across the said discharge devices.

3. In an electrical installation of the character described, a plurality of oscillating circuits, the circuits having in common a source of direct current supply and an impedance, either fixed or variable, and each said circuit separately comprising a capacitative reactance and a discharge device shunted across said capacitative reactance and designed to break down disruptively when the charge on said capacitative reactance exceeds a predetermined voltage, mechanical connector for connecting said source of supply and said impedance intermittently and alternately into first one and then the other of said oscillating circuits, pulsating circuits associated one with each of said oscillating circuits and each containing a source of current supply, a grid valve amplifier, and a relay, and leads so connecting the corresponding oscillating circuit with its pulsating circuit that the frequency of the discharges across said valves and hence the frequency of the impulses coursing through the corresponding relay is determined by the frequency of the discharges across said discharge device in the oscillating circuit, a differential device, the elements of which are controlled in convenient directions by said relays, which differential device causes additional accessories to perform a resultant movement in one or the other direction or to asume a resultant position depending upon the relative frequencies of the discharges in the said two oscillating circuits across the said discharge devices, the said additional accessories assuming the form of means governed by the differential and acting upon said mechanical connector, causing this latter to change its position so as to vary the proportion between the values of the impedances and therefore the intensities of the currents which are connected alternately during each cycle to said oscillatory circuits in such manner that the frequencies of the discharges in said circuits are caused to be equal with one another, the conditions of equilibrium being thus produced in the differential device.

JOSÉ SOLER.